Aug. 22, 1939.　　　R. H. GREEGOR　　　2,170,021
TRUCK BODY AND DOOR CONSTRUCTION
Filed Jan. 6, 1937　　　5 Sheets-Sheet 1
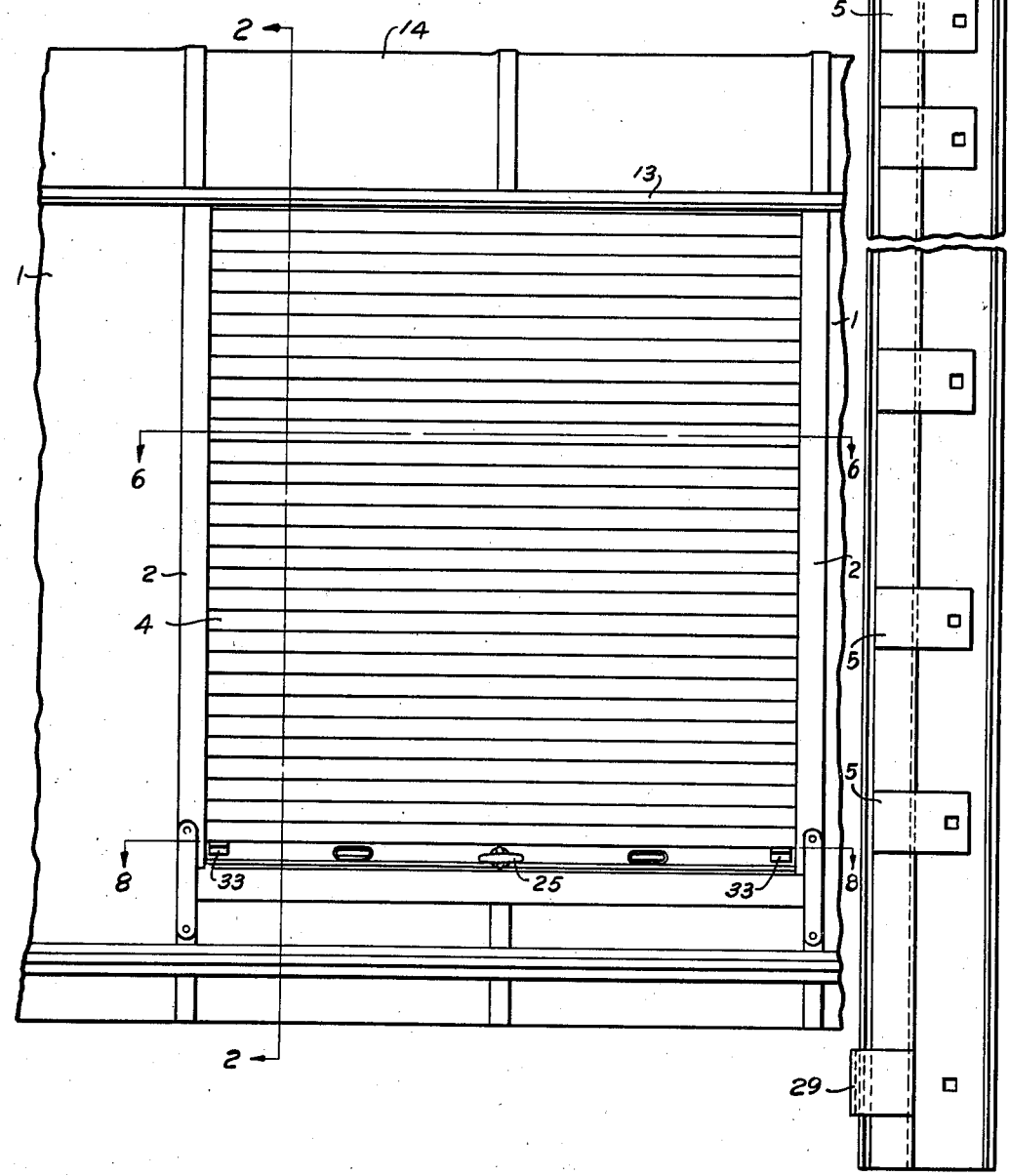
INVENTOR
RALPH H. GREEGOR.
BY
ATTORNEYS

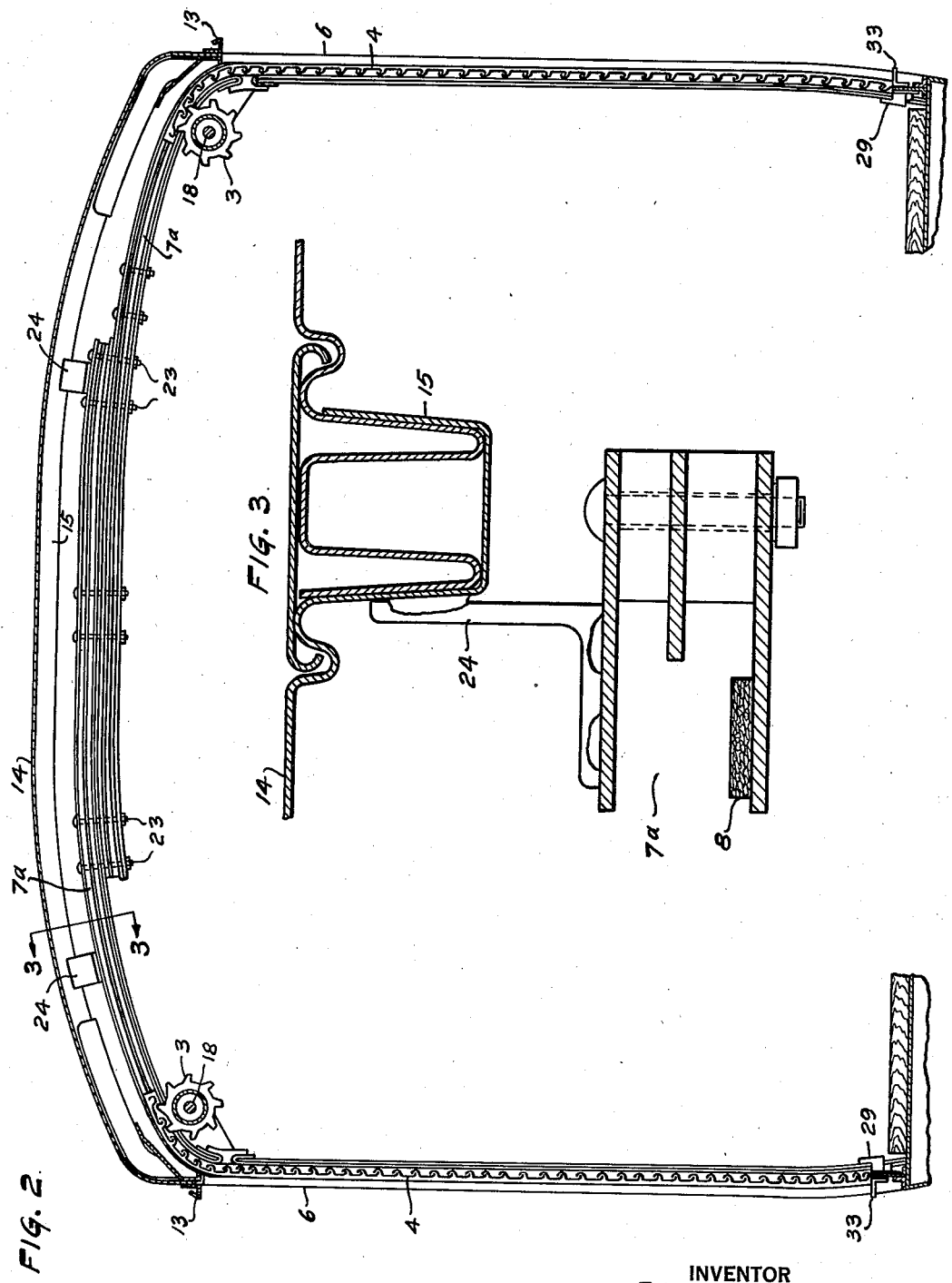

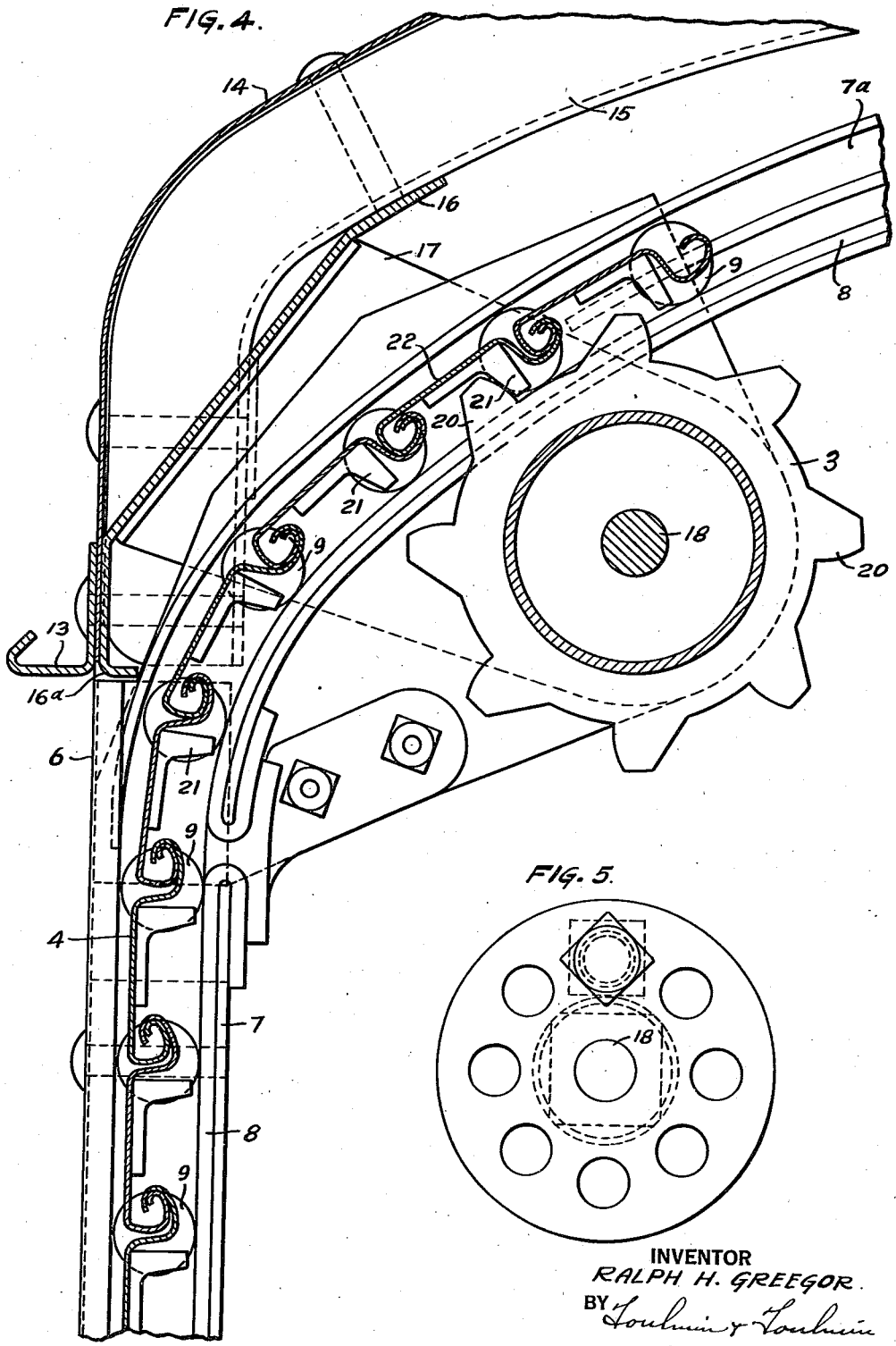

Aug. 22, 1939.   R. H. GREEGOR   2,170,021
TRUCK BODY AND DOOR CONSTRUCTION
Filed Jan. 6, 1937   5 Sheets-Sheet 4
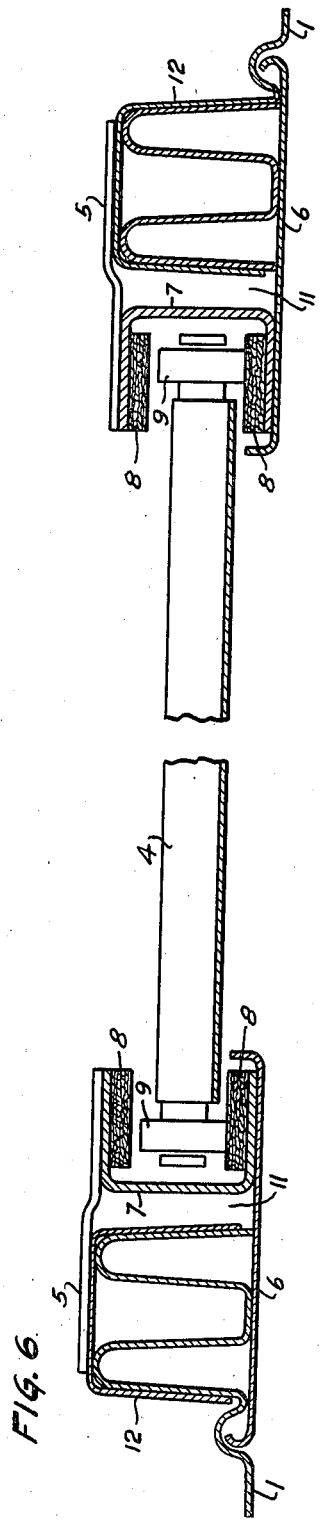
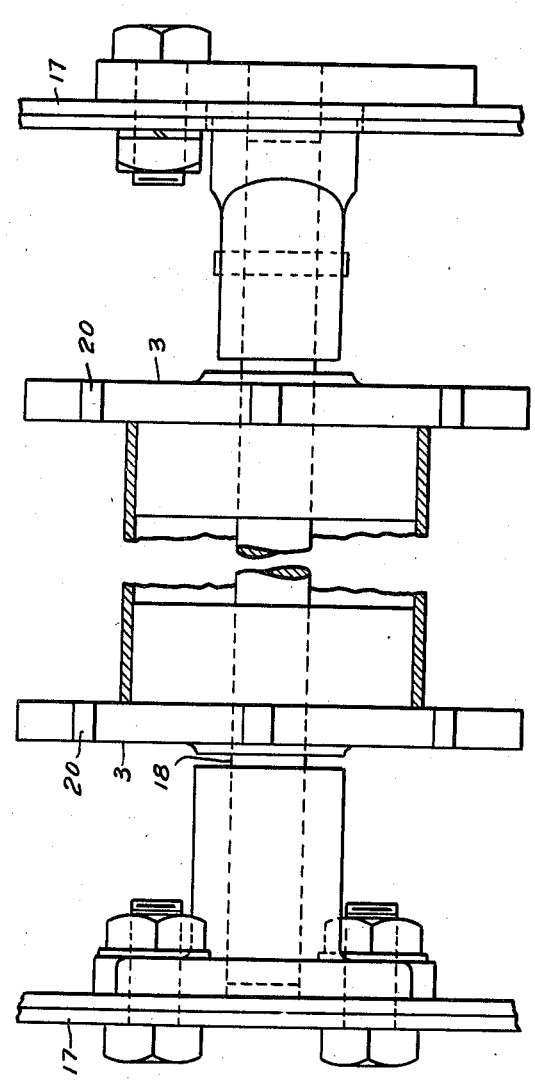
INVENTOR
RALPH H. GREEGOR
BY
ATTORNEYS

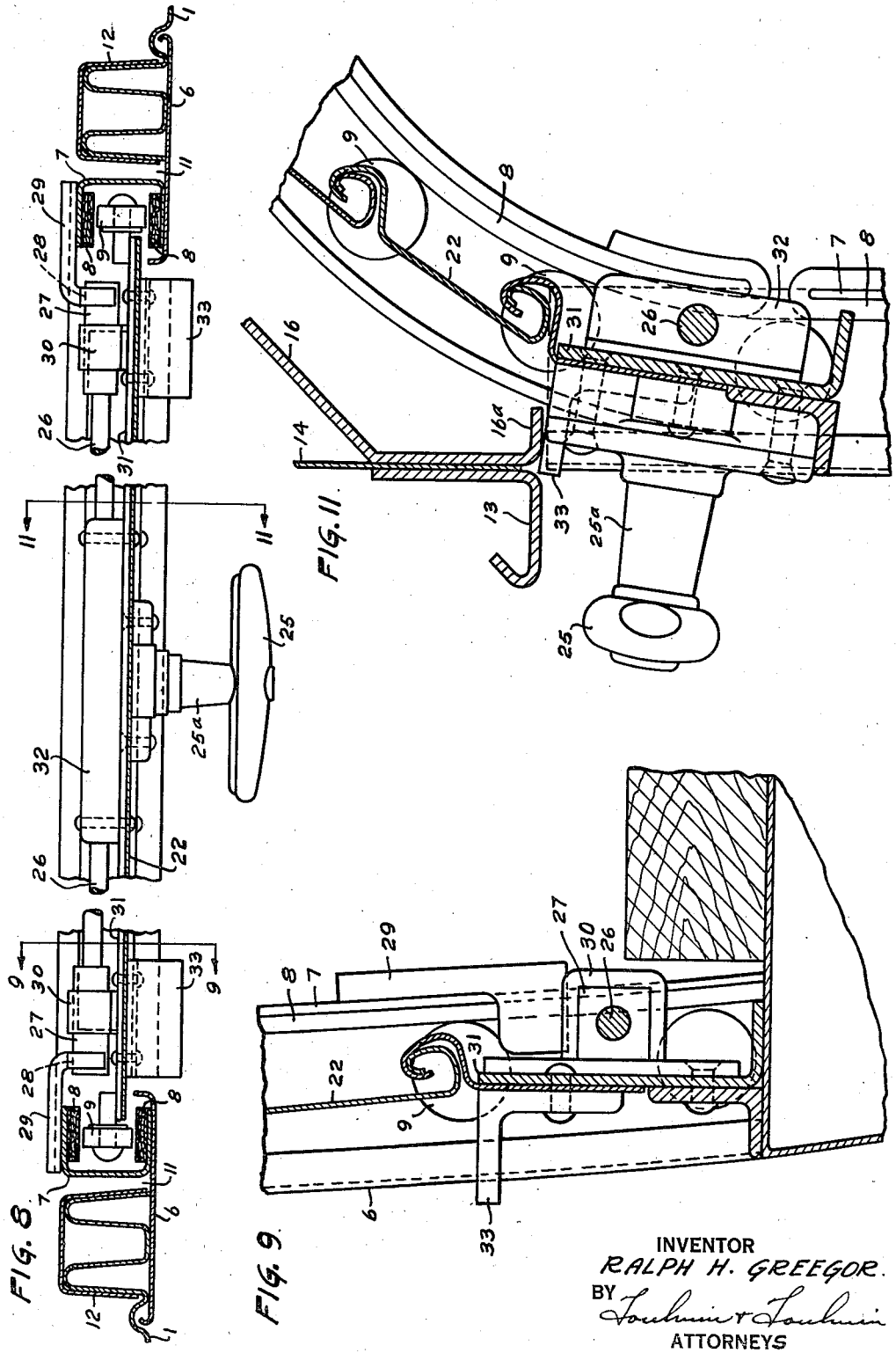

Patented Aug. 22, 1939

2,170,021

UNITED STATES PATENT OFFICE 2,170,021

TRUCK BODY AND DOOR CONSTRUCTION

Ralph H. Greegor, Columbus, Ohio, assignor to General Door Company, Reno, Nev., a corporation of Nevada Application January 6, 1937, Serial No. 119,302

2 Claims. (Cl. 296—140)

My invention relates to bodies for vehicles and in particular to rolling doors for vehicles.

It is my object to provide the combination of a rolling door, a vehicle enclosure, and cooperative means supported by the enclosure for operating and positioning the door.

My invention is particularly adaptable to automotive vehicles such as trucks, busses and the like where rolling steel doors on the sides and rear of the vehicle are utilized. Closed openings may be employed in the loading or unloading of the vehicle.

A special object of my invention is to provide the combination of a structural framework for guiding the rolling steel doors of my invention, for the supporting of the actuating mechanism therefor, and for supporting the covering for the vehicle in order to form a unitary structure so that when the door is closed, it will form with the covering of the vehicle on the framework a continuous surface.

It is a further object to provide a framework in which either doors or the covering of the vehicle may be used interchangeably for closing the spaces between the framework of the body of the vehicle.

Referring to the drawings:

Figure 1 is a side elevation in detail of a portion of the side walls and top of the vehicle and with one of the doors in closed position.

Figure 2 is a section on the line 2—2 of Figure 1.

Figure 3 is a section on the line 3—3 of Figure 2.

Figure 4 is a detailed section such as that shown in the left hand upper corner of Figure 2.

Figure 5 is a detailed view of a part of the actuating mechanism for raising and lowering the rolling steel door.

Figure 6 is a section on the line 6—6 of Figure 1 looking downwardly. It shows the framework for guiding the rolling steel door, the rolling steel door and its guiding rollers, and the covering for the body on the framework.

Figure 7 is a plan view of the balance shafts.

Figure 8 is a section on the line 8—8 of Figure 1 showing in detail the locking mechanism for locking the rolling steel door in its lowermost position.

Figure 9 is a vertical section on the line 9—9 of Figure 8 showing the bend in the guide rails and the door in closed position.

Figure 10 is a front elevation of the guide rails.

Figure 11 is a section on the line 11—11 of Figure 8 looking in the direction of the arrows and showing the locking mechanism with the door in open position.

Referring to the drawings in detail, 1 designates the cover of sheet metal forming the covering for the body. This cover is mounted upon a framework 2. The framework 2 is used also to support the actuating mechanism such as the toothed spring-pressed feed sprockets 3 and the rolling steel door 4.

The frame plates consist of the plates 5 and 6 that are connected together by the U-shaped track guides 7 having the wear surfaces 8. These guides guide the rollers 9 on the ends of the steel door or curtain 4. The space 11 between the plates 5 and 6 is occupied by vertical reinforcing members 12 on the ends of the cover sheets 1.

These vertical frame members are provided with horizontal reinforcing gutters at the top of the doors on the outside of the frame designated 13. The roof of the body consists of cover sheets 14 mounted on the angular frame members 15. These members have bolted thereto bracket plates 16 on which brackets 17 are mounted that carry the ends of the axle 18 that constitutes the feeding mechanism for raising and lowering the door.

This feed mechanism consists of the sprockets 3 whose teeth 20 engage with the metal shoulder plates 21 on the inside of the sections 22 constituting the door 4. The door 4 on one side is guided in overhead arcuate extension tracks 7a which overlap for the respective sides of the respective doors. These overlapping tracks are supported by the bolts 23. Supporting brackets 24 support the tracks on the overhead framework 15.

The raising and lowering mechanism is provided with suitable springs wound around the axle 18. The details of this mechanism are of no importance in this present invention.

The lower end of the door is provided with a handle 25 which actuates a transverse locking rod 26 having locking heads 27 that are inserted within members 38 in the locking flanges 29 mounted on the frame members 7. These locking heads or bolts 27 are guided in sleeves 30 mounted on a transverse flange or base plate 31. By rotating the handle 25 on its shaft 25a, the rods 26 by a suitable mechanism in the box 32 actuates the rods 26 for locking or unlocking them.

As will be seen in Figure 11, the bottom of the door also carries a transverse angular flange member 33 which serves to engage with the upper transverse frame member, which is the turnedover edge of the bracket plate 16 and is designated 16a. This limits the upward movement of the door.

It will be noted in Figure 2 and in Figure 9 that the bottom of the vertical trackways for the rolling steel door is curved inwardly. This results in the surface of the door suitably draining the rain off the face of the door adjacent the base. It also results in making a tight joint at the foot of the door at a point below the surface of the wooden floor of the vehicle.

It will be understood that I desire to comprehend within my invention such modifications as come within the scope of my claims and my invention.

Having thus fully described my invention, what I claim as new and desire to secure by Letters Patent, is:

1. In a vehicle body having a top and side walls with a door opening, guide tracks having vertically disposed portions on opposite sides of said door opening and substantially horizontal portions connected thereto by curved portions between said vertical and horizontal portions, an articulated door slidably mounted in said guide tracks, and a sprocket disposed adjacent said curved portion with its teeth engaging said articulated door, said guide tracks extending up to and past said sprocket teeth on both sides thereof and said sprocket teeth carrying the weight of the door only through tangential thrusts whereby the weight of the door at said sprockets is supported partly by said sprocket teeth and partly by said guide tracks so that the teeth of the sprocket are subjected only to tangential thrusts and are free from radial thrusts set up by said weight.

2. In a vehicle body having a top and side walls with a door opening, vertical frame members on opposite sides of said door opening, guide tracks having vertically disposed portions on opposite sides of said door opening and substantially horizontal portions connected thereto by curved portions between said vertical and horizontal portions, an articulated door slidably mounted in said guide tracks, brackets mounted on said vertical frame members, a sprocket shaft rotatably supported in said brackets adjacent said curved track portions, and spaced sprockets engaging said articulated door, said guide tracks extending up to and past said sprocket teeth on both sides thereof and said sprocket teeth carrying the weight of the door only through tangential thrusts whereby the weight of the door at said sprockets is supported partly by said sprocket teeth and partly by said guide tracks so that the teeth of the sprocket are subjected only to tangential thrusts and are free from radial thrusts set up by said weight.

RALPH H. GREEGOR.